(12) United States Patent
Curlook

(10) Patent No.: US 6,391,089 B1
(45) Date of Patent: May 21, 2002

(54) ACID LEACHING OF NICKEL LATERITE ORES FOR THE EXTRACTION OF THEIR NICKEL AND COBALT VALUES

(76) Inventor: Walter Curlook, 25 Cluny Dr., Toronto, Ontario (CA), M4W 2P9

(*) Notice: Subject to any disclaimer, the term of this patent is extended or adjusted under 35 U.S.C. 154(b) by 0 days.

(21) Appl. No.: 09/725,293

(22) Filed: Nov. 29, 2000

(51) Int. Cl.$^7$ ................................................ C22B 3/08
(52) U.S. Cl. ........................ 75/743; 423/150.3; 423/145
(58) Field of Search ............................ 423/145, 150.3; 75/743

(56) References Cited

U.S. PATENT DOCUMENTS

| | | |
|---|---|---|
| 3,804,613 A | 4/1974 | Zundel et al. |
| 4,214,901 A * | 7/1980 | Michal et al. .............. 423/148 |
| 4,541,994 A | 9/1985 | Lowenhaupt et al. |

OTHER PUBLICATIONS

Marshall, William L.; Gill, James S.; and Slusher, Ruth; Aqueous Systems At High Temperature–VI Investigations on the System $NiO$–$SO_3$–$H_2O$ and Its $D_2O$, J. Inorg. Nucl. Chem. 1962, vol. 24, pp 889–897.

* cited by examiner

Primary Examiner—Melvyn Andrews
(74) Attorney, Agent, or Firm—Lynn C. Schumacher; Hill & Schumacher

(57) ABSTRACT

An improved process of hydrometallurgical treatment of laterite ores predominantly of the limonitic type for the recovery of nickel and cobalt using sulphuric acid. In order to obtain high extractions of these metals while treating these ores in their humid state, in reaction times of up to 60 minutes, temperatures of up to 270° C. and corresponding pressures of up to 800 psia are used. In the present invention, a significant portion of the "mother liquor" emanating from the pressure leaching reaction is recycled to the feed preparation stage thereby substituting for all or a major proportion of the water that must be added. Concomitantly with the major savings in water requirements, a significant reduction in new sulphuric acid requirements is effected along with a corresponding saving in limestone and lime required for subsequent neutralizations. The amount of process water released to the environment is significantly reduced or eliminated.

27 Claims, 4 Drawing Sheets

ACID LEACHING OF NICKEL LATERITE ORES FOR THE EXTRACTION OF THEIR NICKEL AND COBALT VALUES

FIELD OF THE INVENTION

The invention describes improvements in the commercial-scale processing of nickel and cobalt containing laterite ores for the recovery of these metals, by reacting such ores with sulphuric acid at elevated temperatures and pressures

BACKGROUND OF THE INVENTION

For over a century, nickel laterite ores high in magnesia, relatively low in iron, and enriched in nickel, commonly referred to as garnierite ores or saprolite ores, have been processed by pyrometallurgical means to produce either a ferronickel, a Class II nickel product that could go directly to market for the production of stainless steels, or to produce an intermediate sulphide "matte" product that could go to refineries for conversion to either Class I or Class II nickel products. A good portion of the cobalt would be lost, some in the slag during the smelting stage, and in the case of ferronickel most of the cobalt would be present as a product impurity of no value. Such pyrometallurgical processes involve drying the humid ores, preheating them with or without effecting a partial reduction, and subsequent reduction smelting at high temperatures in electric furnaces. It is axiomatic that such pyrometallurgical processes consume high amounts of energy per unit of nickel production, and in most cases result in complete loss of value of the cobalt that accompanied the nickel in the ore.

About half a century ago, an ammoniacal leaching process was developed and commercialized which could treat laterite ore relatively high in iron and of lower nickel content than the garnierites and saprolites. It employed a combination of pyrometallurgical and hydrometallurgical technologies. The laterite ore is first dried and then subjected to partial reduction in Herreschoff furnaces or rotary kilns, at elevated temperatures but well below smelting temperatures, to selectively reduce the nickel and cobalt but only partially reduce the iron. This partially reduced calcine is then quenched and leached in ammoniacal carbonate solutions to dissolve nickel and cobalt; and the nickel is subsequently recovered from the ammoniacal leach solution as a nickel hydroxide/carbonate which would then be converted to a Class II nickel oxide or to utility-grade nickel. In some cases the nickel solutions would proceed to electrolytic refining for the production of refined nickel. Nickel extractions seldom exceed 80% and cobalt extractions seldom exceed 45%. While this hybrid pyrometallurgical-hydrometallurgical process could treat the high-iron, low-magnesia and low-nickel laterite ores, often referred to as limonite ores, and is less demanding of energy than the smelting process, in actual continuous practice, the nickel recoveries often fall below 75% and cobalt recoveries below 40%.

Research in the early 1950's demonstrated that by subjecting the high-iron, low-magnesium and low-nickel laterite ores, that is the limonites, also containing significant quantities of cobalt, directly in their humid state to sulphuric acid at elevated temperatures and pressures, that nickel and cobalt extractions of over 90% could be achieved with the energy requirement only a fraction of that required by the smelting or ammoniacal leaching processes. While this technology heralded a new era for the production of nickel and cobalt, only one commercial plant was built at Moa Bay in Cuba. This plant confined itself to the processing of limonites very low in magnesia content, i.e., with less than 1% magnesium oxide, and operated at around 240° C. and 475 psig. The plant which is in operation today, employs pachuca-type autoclaves which rely on the process steam to provide both the heat requirement and the agitation which is inadequate and promotes build-up inside these autoclaves which in turn necessitates frequent shutdowns for cleanouts. The product of the Moa Bay plant is an intermediate nickel-cobalt sulphide, which is sent overseas for refining to marketable nickel and cobalt end products.

The value of this new hydrometallurgical technology that could treat humid ores directly without drying and which yields impressively high extractions of nickel and cobalt, became more and more appreciated as a result of the energy crises of the 1970's and 1980's and as a need grew for new sources for cobalt outside of Zaire and Zambia whose production had dropped off drastically. At the same time, the development and demonstrated success of large-scale mechanically-agitated compartmentalized autoclaves in other industries such as the gold industry, gave added interest for application of such reactors to the processing of nickel-cobalt laterites. In such reactors, the requirement for process steam and for agitation are managed and adjusted independently one of the other. Furthermore, extensive research developmental work carried out by P. C. Duyvesteyn, G. R, Wicker, R. E. Doane of Amax Extractive & Development Inc. "An Omnivorous Process for Laterite Deposits", International Laterite Symposium, Evans, Shoemaker, Veltman Eds., TMS-AIME, Kingsport Press, Kingsport Tenn., 1979, demonstrated that enhanced results could be realized at somewhat higher temperatures of around 270° C. and corresponding pressures of around 800 psia; and that this new technology employing mechanically-agitated reactors need not limit itself to the very low-magnesia laterite ores, but could be applied to ores containing several percent of magnesia. Of course, acid requirements increase significantly as the magnesia increases as does the requirements for neutralizing agents. The greatest impetus to proceed with this new technology comes from engineering and economic analyses which indicate that hydrometallurgical process plants could be constructed at a capital cost per unit of annual nickel and cobalt production substantially below that of the established conventional processes and would yield a unit cost of production which permits economic treatment of limonites with as little as 1% of nickel, material that up until now had been considered as overburden and uneconomical to process, i.e., material that previously could not be classified as ore. This has led to the construction of three separate acid pressure leaching plants in Australia, with commissioning in 1999/ 2000.

U.S. Pat. No. 4,541,994, 1985, assigned to Lowenhaupt et al. speaks of reacting "coarse, magnesium rich fractions" with partially neutralized pregnant liquors produced by high pressure leaching, at lower pressures, and claims carrying out of such reactions "at a pressure of from atmospheric to about 300 psig", also "wherein said pressure is atmospheric and said temperature is below 80° C.", also "wherein said temperature is about 60° C.", and also "wherein said temperature is ambient". Their atmospheric leach tests Nos. 7, 8, 9 and 10 at 80° C., for example, demonstrated that nickel and cobalt tend to be upgraded in the fine fractions and magnesium in the coarse fractions. In these tests, the Mg:Ni ratio in the +200 mesh size in relation to the Mg:Ni ratio in the −200 mesh averaged 2:1; and the Mg:Co ratio in the +200 mesh size in relation to the Mg:Co ratio in the −200 mesh size averaged 2.1:1. Only the −200 mesh size would proceed to acid pressure leaching. While less acid would thus be required per unit of nickel and cobalt to yield high extractions in the pressure leach, overall nickel and cobalt recoveries would be greatly decreased.

Currently, in preparation for the pressure leaching, the humid predominantly limonitic laterite ores are pulped with substantial quantities of calcium-free water either from a "fresh" water source or with de-ionized saline water, to a pulp density usually under about 40% solids; and excess acid is added to the autoclaves to effect the desired leaching in 60 minutes or less, when employing reaction temperatures of up to 270° C.

It is well understood and appreciated by those familiar with acid pressure leaching of laterite ores, that the pH of acidic leaching solutions is different at elevated temperatures than at temperatures below 100° C.; and that the solubility of metals such as nickel, cobalt, manganese, and magnesium drops off drastically at temperatures above about 150° C. Accordingly, sulphuric acid well in excess of that theoretically required to sulphate the desired metals must be employed to maintain an adequate level of acidity at the elevated reaction temperatures, as well as to enhance the kinetics of the sulphating reactions. The net result is that the leachate emanating from the autoclaves after being cooled and de-pressurized, can contain as much as 30 grams per liter to as much as 50 grams per liter of free sulphuric acid.

Typically, with low-magnesia limonite ores the sulphuric acid addition to the feed is about 30% by weight of the ore (on a dry weight basis); and the free acid in the leachate could represent at least 25% and as much as 40% of the initial acid addition under certain operating conditions. Before proceeding to recovery of the nickel and cobalt from the leachate by any of the conventional means of precipitation with hydrogen sulphide or by more-recently developed solvent-extraction or ion-exchange technologies, or by precipitation by more common basic neutralization agents such as magnesia or sodium oxides or carbonates, it is usual to carry out a preliminary partial neutralization with limestone to a pH of 3.5 to 4.5 in order to neutralize the bulk, that is over 95%, of the free acid and to precipitate most of the ferric iron. At this stage the partially neutralized leachate would be virtually saturated with calcium sulphate. The overall impact of this partial neutralization technique is that a significant tonnage of excess acid is wasted, a significant tonnage of extra limestone is required to neutralize the excess acid, the partially-neutralized pregnant solution is saturated with calcium sulphate, following metal recovery the barren solution cannot be recycled to preparation of new feed for the autoclaves, and substantial quantities of process effluent needs to be discharged to the external environment after final neutralization to lower the concentrations of base metal contaminants.

As already stated, one of the basic tonnage materials required to carry out acid pressure leaching, besides the ore and sulphuric acid, is water. It is necessary to pulp and dilute the ore feed to about 40% solids or lower. It is highly desirable, and in most cases essential, that this make-up water be free of calcium so as to avoid problems that could arise from calcium sulphate precipitation particularly in the preheating system at the feed end of the pressure system autoclaves. Thus, commercial installations rely on fresh water sources if such are available, or arrange for de-ionization of saline waters. The tonnage of calcium-free water required is very large, usually in the order of a tonne of water for every tonne of raw humid laterite ore. While adequate quantities of fresh water may be available for initial demonstration plants, it is unlikely that there would be enough available for any large-scale operations and expansions. Furthermore, there is a serious environmental consideration in that every tonne of fresh water taken into the process usually results in a comparable tonnage of process water that must be discarded eventually to the sea, and which could carry certain quantities, albeit minute quantities, of base metals and other contaminating elements.

SUMMARY OF THE INVENTION

It is an object of the present invention to provide a process of hydrometallurgical treatment of laterite ores of the limonitic type for the recovery of nickel and cobalt which reduces the amount of fresh water needed for pulping the feedstock and the amount of sulphuric acid used in the chemical leaching step.

In the improved method of the present invention, a significant portion of the "mother liquor" emanating from the autoclaves is recycled to the feed preparation stage thereby substituting for all or at least a major proportion of the fresh water or de-ionized water that must be added and also supplying a portion of the amount of sulphuric acid that is required for leaching. Concomitantly with the major savings in fresh water or de-ionized water requirements, a significant reduction in new sulphuric acid requirements is effected along with a corresponding saving in limestone and lime required for subsequent neutralizations. A further benefit results from the fact that less process waters need to be expelled to the external environment Thus, several significant processing advantages and benefits are simultaneously realized.

The present invention provides a process of leaching a nickel and cobalt containing predominantly limonitic portion of a laterite ore profile, comprising the steps of:

a) preparing a feedstock of a predominantly limonitic portion of a laterite ore containing nickel and cobalt;

b) pulping said feedstock with a liquid to produce a pulped ore;

c) adding an effective amount of sulphuric acid to the pulped ore to produce a sulphuric acid solution, agitating and leaching said feedstock in said sulphuric acid solution at an elevated temperature under pressure for a selected period of time whereby metal oxides are leached from said ore to produce a leach pulp;

d) separating said leach pulp into a mother liquor solution and a first thickened leach pulp, wherein said liquid used to pulp said feedstock in step b) includes a selected amount of said mother liquor solution; and e) recovering nickel and cobalt products from said first thickened leach pulp.

In a variation of the present invention, acid efficiency may be further increased by reacting the first thickened leach pulp with highly-serpentinized, high-magnesia nickel saprolite ore, at atmospheric pressure and preferably above 90° C. and below 100° C., to achieve partial neutralization of the excess acid before it passes on to further neutralization with limestone and subsequently passing on to a decantation step (preferably using counter-current decantation) for solids-liquid separation and recovery of a clarified pregnant solution containing the nickel and cobalt values originating from both the limonitic ores treated at high temperatures and pressures and the highly-serpentinized saprolitic ores treated subsequently by atmospheric leaching.

In a further variation of the present invention, additional advantages are realized by completely eliminating the requirement for limestone and lime by carrying out preliminary partial neutralizations firstly with a highly-serpentinized high-magnesia saprolite ore and subsequently by the use of magnesite, $MgCO_3$ or magnesia, $MgO$ before passing onto solid-liquid separation and recovery of the clarified pregnant solution. The saprolite ore contributes nickel and a lesser amount of cobalt units and reduces substantially the quantity of the other neutralizing agents that would otherwise be required. When producing an intermediate nickel-cobalt product, final neutralization could be effected by any non-calcium basic oxides such as magnesia, or sodium-based oxides, carbonates or hydroxides. The metal values could alternatively be precipitated with $H_2S$ or sodium sulphide compounds; or could be recovered by either solvent extraction means or with chelating resins.

BRIEF DESCRIPTION OF THE DRAWINGS

The process for acid leaching of nickel and cobalt containing laterite ores in accordance with the present invention will now be described, by way of example only, reference being had to the accompanying drawings, in which.

DETAILED DESCRIPTION OF THE INVENTION

Figure 1:
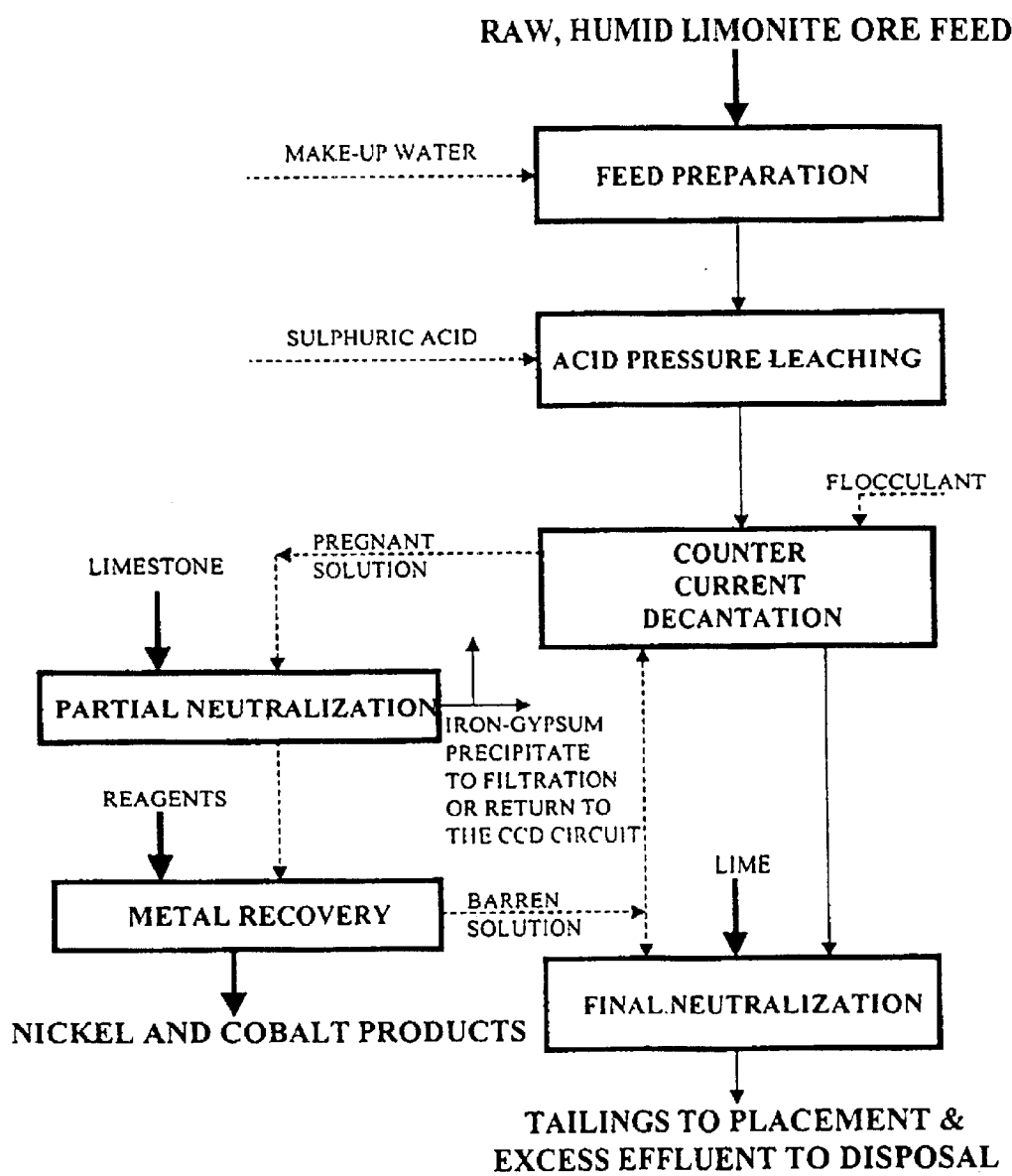
FIG. 1 is a flowchart showing the steps common to most of the prior art pressure acid leaching processes for extracting nickel and cobalt from laterite ores.

Sulphuric acid is being used in the hydrometallurgical treatment of laterite ores of the limonitic type for the recovery of nickel and cobalt. More particularly, the prior art process of acid pressure leaching of high-iron limonitic-type laterites, as shown schematically in FIG. 1, is very efficient in extracting both the nickel and the cobalt at levels above 90%; but requires large quantities of sulphuric acid including a significant proportion of excess acid plus large quantities of limestone for subsequent neutralization. The raw limonitic ore can contain 40% or more of free moisture in its natural state. However additional water needs to be added for pulping the ore to a pulp density usually under about 40% solids and preferably in the range of 30% to 40% solids, depending on whether the preheating of the feed pulp is by indirect or by direct heat exchange with the steam produced in the pressure letdown system, in preparation for pressure leaching. Accordingly, there is a large demand for water to make up the liquid phase. In normal practice the water added in feed preparation is fresh water, roughly in the proportion of one tonne of fresh water to one tonne of ore in its natural state. This represents a heavy demand on fresh water supplies. Furthermore, this quantum of water must eventually be treated with lime or some other neutralizing agent to insure removal of base metals prior to discharge to the external environment. In this single pass system, acid efficiency when effecting 95% extraction of the nickel and cobalt is, at best, about 75%, and could be as low as 60%.

Figure 2:
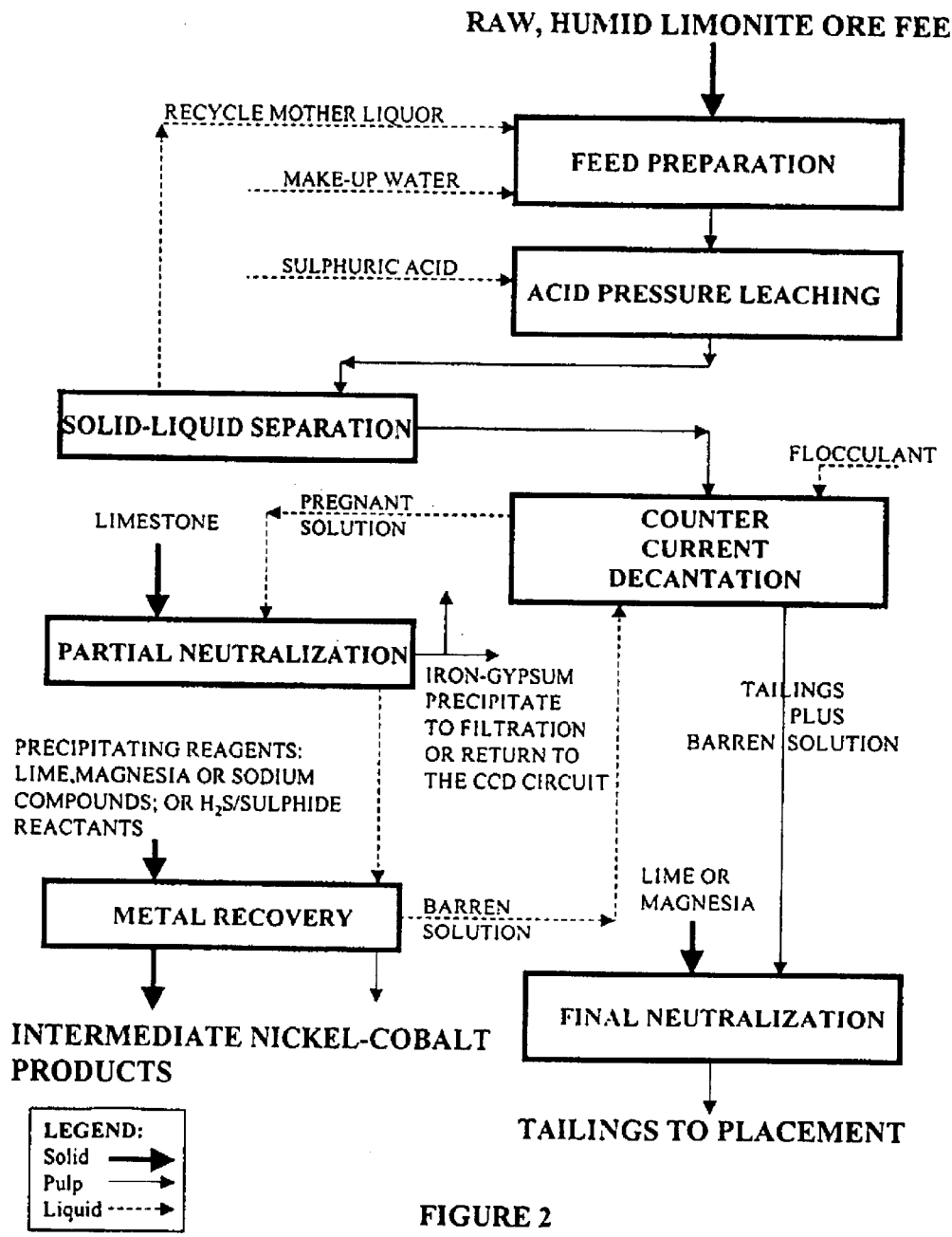
FIG. 2 shows a flowchart showing the steps of the process of acid leaching nickel and cobalt containing laterite ores according to the present invention.

The present improved process re-cycles "mother liquor" emanating from the autoclaves back to feed preparation and thereby virtually eliminates the need for fresh water addition at this stage, as depicted in FIG. 2. The net result is a series of important improvements including: the requirement for fresh water for feed preparation is virtually eliminated; acid efficiency is increased significantly, and acid requirements reduced significantly; limestone requirements are correspondently reduced, significantly; the quantity of process water to be disposed to the external environment is reduced, very substantially; the downstream metal recovery system is reduced in size as the re-cycling yields a pregnant solution of higher nickel and cobalt concentrations; and overall, the unit cash operating costs are favourably impacted, i.e. reduced.

The "leach pulp" is produced by pressure leaching the pulped ore at elevated temperatures in the sulphuric acid solution and therefore, as used herein, the term "leach pulp" refers to the leached ore and solution containing the dissolved metals so that the "leach pulp" comprises both solids and liquids. This solution produced by the pressure leaching is referred to as the "mother liquor" as mentioned above. The liquid used to pulp the feedstock ore is made up of a significant portion of the mother liquor solution produced by the pressure leaching of the pulped ore.

As can be seen by comparing the prior art process shown in the flowchart of FIG. 1 and the process according to the present invention shown in the flowchart of FIG. 2, the main additional equipment required to practice the present invention is a thickener to receive the hot leach pulp emanating from the autoclave(s) in order to separate solids from liquid thereby permitting re-circulation of a portion of the liquid—mother liquor—to the feed preparation step in quantities as determined by process requirements. It should be recognized that the materials of construction accommodating the hot acidic mother liquor must be corrosion resistant metals or alloys. With regard to the disposal of the iron-gypsum precipitate, there are two options: one is to return it to the counter-current-decantation system; and the other is to de-water and wash it in a separate filtration plant.

Referring to FIG. 2, the process of leaching a nickel and cobalt containing predominantly limonitic portion of a laterite ore profile, comprises preparing a feedstock of a predominantly limonitic portion of a laterite ore containing nickel and cobalt by conventional crushing, screening and fine grinding the starting material. The ground ore of which the prepared feedstock is comprised should preferably be essentially all of minus 100 mesh size. The next step in the process is to pulp the prepared feedstock with the liquid to give a pulped ore with a density preferably between about 30% and 40% solids depending on certain other process design parameters. This pulping step may be carried out in a rotating type of vessel similar to a grinding mill but without any grinding medium. Sulphuric acid is then added to the pulped ore in a pressure vessel to produce a sulphuric acid solution, and the solution is agitated at an elevated temperature whereupon leaching of the feedstock in the sulphuric acid solution occurs. The leaching takes place in autoclaves where a certain pressure is established corresponding to the selected elevated temperature which is maintained by the addition of superheated steam. This process is referred to as pressure leaching. After leaching for a selected period of time metal oxides are leached from the ore to produce the leach pulp. The leach pulp is then removed from the pressure vessel and separated into a mother liquor solution and a first thickened leach pulp. A selected amount of the mother liquor solution is then recirculated back to be used for pulping freshly prepared feedstock. Nickel and cobalt are then recovered from the first thickened leach pulp. As can be seen from FIG. 2, the amount of sulphuric acid added to the pulped ore includes sulphuric acid added directly to the pulped ore in addition to unreacted sulphuric acid present in the mother liquor.

The final composition of the liquid used for pulping the prepared feedstock typically includes the water that accompanied the humid ore feed, the mother liquor solution added, as well as any fresh make-water. The degree of re-circulation of mother liquor and the composition of the pulping liquid will be determined in part by the magnesia and nickel contents of the ore feed. Since the solubility of magnesium and nickel are much lower at the high leaching temperatures than at room temperature, the amount of magnesium and nickel in the liquid comprising mother liquor/water must be kept preferably below those which are soluble at the high leaching temperature employed, otherwise there could be significant precipitation of magnesium and nickel salts in the last feed preheating heat exchanger and in the autoclave itself. The undesirability of introducing too much magnesium and nickel into the system is demonstrated in Example 2 discussed hereinafter. The amount of mother liquor present in the pulping liquid is selected so that the dissolved magnesium does not exceed about 12 grams per liter. The conclusion regarding magnesium is supported by research as disclosed in William L. Marshal and Ruth Slusher of the Reactor Chemistry Division, Oak Ridge National Labratory, Tenn. "Solubility and Hydrolytic Instability of Magnesium Sulfate in Sulfuric Acid-Water and Deuterosulfuric Acid-Deuterium Oxides Solutions, 200° to 350° C.", Journal of Chemical and Engineering Data, Vol. 10, No. Oct. 4, 1965. Regarding nickel, concentrations should be kept below about 15 grams per liter. It can be deduced from research disclosed by William L. Marshall, James S. Gill and Ruth Slusher of the Reactor Chemistry Division, Oak Ridge National Laboratory, Oak Ridge, Tenn., "Aqueous Systems at High Temperature-V1, Investigations on the System $NiO-SO_3-H_2O$ and its $D_2O$ Analogue from $10^{-4}$ to 3 m $SO_3$, 150–450° C.", Journal of Inorganic Chemistry, 1962, Vol. 24, pp 889 to 897, Pergamon Press Ltd., that nickel concentrations in the pressure leaching system should be kept below about 18 grams per liter and preferably below about 15 grams per liter.

Figure 3:
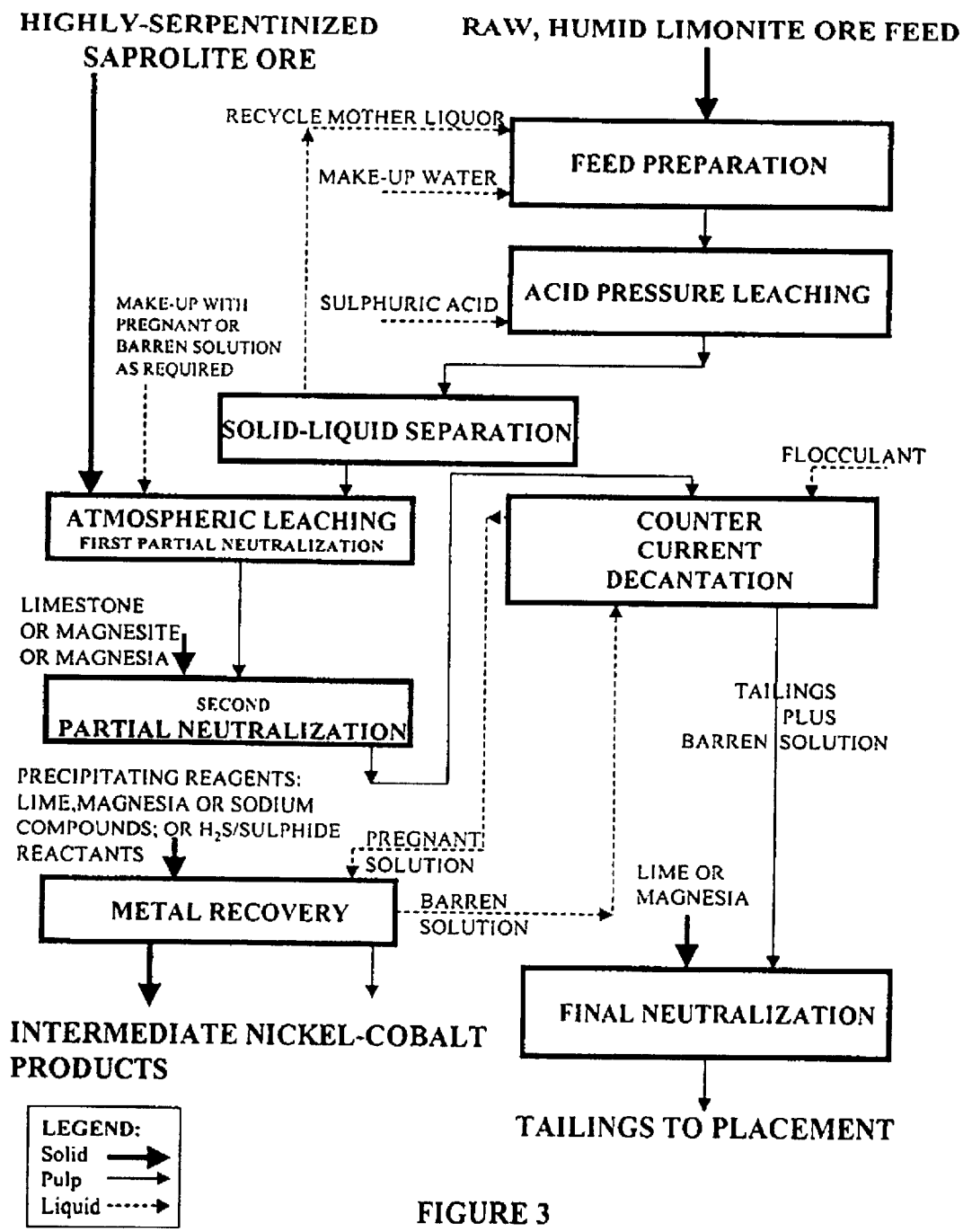
FIG. 3 shows a flowchart illustrating an alternative embodiment of the process of the present invention.
Figure 4:
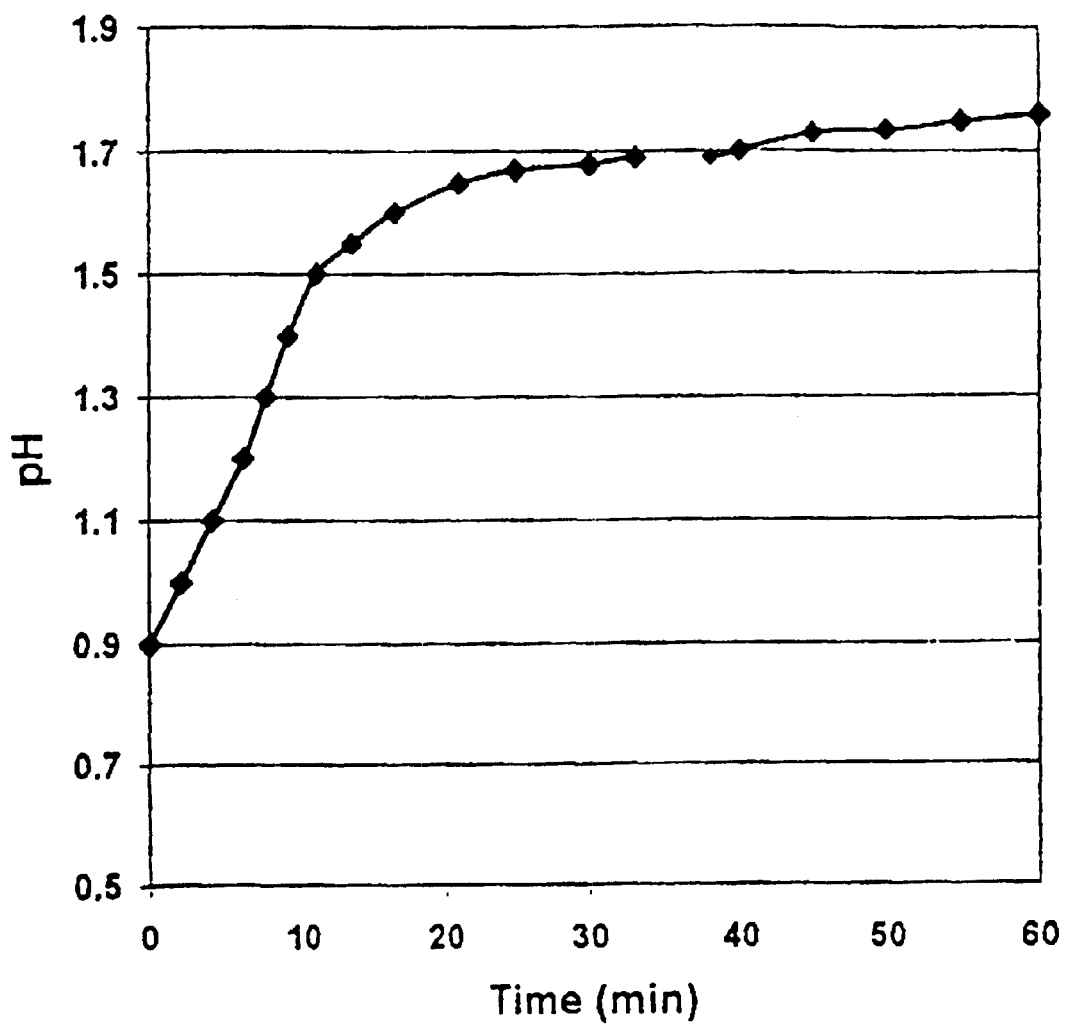
FIG. 4 is a plot of pH versus time showing the atmospheric partial neutralization of leach pulp from pressure leaching of limonite ore using highly-serpentinized saprolitic ore.

Once the reacted pulp exits the pressure system and operating temperatures drop below 100° C. the leachate can dissolve appreciable additional quantities of magnesium as well as other metal salts. To take advantage of this fact, a variation of the present invention contemplates reacting the settled first thickened pulp fraction, after solids-liquid separation of the leach pulp to produce the mother liquor, with highly-serpentinized high-magnesia saprolite ore, to effect the first partial neutralization of the excess acid. FIG. 3 illustrates a flowchart showing the steps in this different embodiment of the process. In addition to the extra equipment requirement of the process of FIG. 2, a separate feed preparation facility is required for crushing and comminuting the highly-serpentinized saprolite ore, as well as a separate installation of leaching tanks to carry out atmospheric leaching/partial neutralization. In this flowchart the iron precipitate, the gypsum, the leached tailings produced by pressure leaching the limonite ore and the tailings produced by atmospheric leaching of the saprolite ore all proceed together to the counter-current-decantation system.

In commercial practice, it may be advantageous to add some pregnant solution or some barren solution, to lower the pulp density at this stage. By bringing the pH up to about 2, over 90% of the excess acid will have been neutralized. The next stage of partial neutralization would be effected by the addition of limestone, lime, magnesite or magnesia to bring the pH up to about 4 in order to precipitate and remove the ferric iron. Following the two stages of partial neutralization the leached and partially neutralized pulp passes on to the counter-current-decantation system, as shown in FIG. 3, for the production of a clarified pregnant solution that goes to metals recovery. Final recovery of the nickel into an impure intermediate product can be carried out in a number of different ways as described in FIGS. 2 and 3 and in the Examples.

In selecting the highly-serpentinized variety of saprolite ore, the present invention achieves neutralization of excess acid with the simultaneous high extractions of the nickel and cobalt contents of the saprolite ore in reaction times of less than one hour.

EXAMPLE 1

To demonstrate the main feature of the present invention, two samples of high-iron low-magnesium relatively low-nickel limonitic laterite ores obtained from the southern region of New Caledonia, but relatively rich in cobalt as shown by the ore analyses in Table 1 were pressure leached with sulphuric acid in a two-liter autoclave, in a series of three tests in which the mother liquor from the first leach test obtained after settling and solid-liquid separation, "ML1", was used to prepare the feed pulp for the second leach test; and the mother liquor from the second leach test obtained after settling and solid-liquid separation, "ML2", was used to prepare the feed pulp for the third leach test. The leaching conditions are summarized in Table 2. The liquid phase, "ML3", of the third leached pulp was very much enriched in nickel and cobalt, and the nickel and cobalt extractions were 95% or higher in all cases, as can be seen in Table 3. Nickel extraction was 96.2% and cobalt extraction 97.0% while recycling of mother liquors increased the metal concentrations to 12.3 gpl Ni and 1.9 gpl Co in the final liquor emanating from the autoclave. The third pulp then proceeded to metal recovery. The first treatment was to react it with fine limestone as in conventional commercial practice, as depicted in FIG. 2, to achieve a pH of 4.7, thereby neutralizing over 98% of its residual free acid and precipitating out gypsum and ferric iron as hydroxide. After settling, filtering and washing of the filter cake with dilute sulphuric acid the resulting diluted liquor, which is now to be referred to as the clarified pregnant solution, was ready to move forward to nickel and cobalt recovery.

Several different processes are currently being employed in commercial practice to recover and separate the nickel and cobalt into refined or semi-refined products. In the present example, intermediate nickel-cobalt products were produced by two different precipitation techniques. The pregnant solution was split into two fractions. One fraction was further reacted with lime, CaO, to a pH of 11, thereby precipitating essentially all of the nickel, cobalt and manganese as hydroxides concomitant with the production of a substantial quantity of gypsum. The other fraction was reacted with soda ash, $Na_2CO_3$, to a pH of 9, thereby precipitating essentially all of the nickel, cobalt and manganese. The analyses of the final products are shown in Table 1. An excess of lime was added in the first case, accounting for the lower-than-expected grade in the final product.

Those skilled in the art will appreciate that in the flowscharts depicting the present process in FIGS. 2 and 3, the basic neutralizing agents could be added as finely ground dry products, or as finely ground and pulped products where the pulping liquor could be fresh water, barren solution or pregnant solution, as deemed appropriate.

In continuous commercial operation wherein the feed is preheated by direct heat exchange with live steam from the pressure letdown system, with a limonitic ore feed of about 1.5% Ni, the circulation of mother liquor to the extent that it would supplant 100% of the fresh water required for feed preparation would yield liquor emanating from the autoclaves containing between 14 and 15 gpl of Ni as compared to liquor of between 8 and 9 gpl Ni by conventional use of fresh water alone. Since the free acid contents of these two liquors would be essentially the same, it is calculated that the acid efficiency will have been increased to about 86% % from about 75% % by the re-circulation of mother liquor. Thus, besides drastically reducing fresh water requirements in the overall processing, there is a substantial gain from reducing acid requirement per unit of nickel recovered. Further advantages stem from the fact that lesser quantities of neutralizing agents would be required, the downstream equipment could be downsized with the higher-grade clarified pregnant solution, and the amount of liquid effluent released to the external environment would be drastically reduced.

TABLE 1

Acid pressure leaching of limonite ores

Chemical Composition Wt %

|  | Ni | Co | Mn | Fe | Mg | $SiO_2$ | $Al_2O_3$ | $Cr_2O_3$ |
|---|---|---|---|---|---|---|---|---|
| Ores | | | | | | | | |
| NC-1 | 1.45 | 0.23 | 1.63 | 49 | 0.25 | 2.3 | 5.0 | 2.4 |
| NC-2 | 1.17 | 0.21 | 1.45 | 49 | 0.25 | 2.2 | 5.1 | 2.2 |
| Residues | | | | | | | | |
| 1st Leach | 0.013 | 0.003 | 0.24 | 54 | 0.14 | 2.9 | 3.3 | 0.1 |
| 2nd Leach | 0.047 | 0.012 | 0.46 | 54 | 0.14 | 2.7 | 2.9 | 0.1 |
| 3rd Leach | 0.055 | 0.007 | 0.52 | 56 | 0.12 | 2.5 | 2.9 | 0.1 |
| Products | | | | | | | | |
| CaO ppt | 6.5 | 1.1 | 5.9 | 0.0 | 1.2 | 0.0 | 0.0 | 16 |
| $Na_2CO_3$ ppt | 18.2 | 2.9 | 15.7 | 0.0 | 2.6 | 0.0 | 0.0 | 3.8 |

TABLE 2

| | | Weights of Reactants | | | | | | Leach Conditions | | |
|---|---|---|---|---|---|---|---|---|---|---|
| Ore Sample | Leach No. | Ore g | $H_2O$* g | $H_2O$ g | "ML" g | $H_2SO_4$ g | $H_2SO_4$ % of Ore | Pulp % Solids | Temp °C. | Press psia | Time min |
| NC-2 | 1st | 360 | 240 | 500 | — | 102 | 28 | 30 | 270 | 800 | 30 |
| NC-1 | 2nd | 360 | 240 | 18 | 500 | 82 | 28 | 30 | 270 | 800 | 30 |
| NC-1 | 3rd | 360 | 240 | 50 | 490 | 81 | 28 | 30 | 270 | 800 | 30 |

*This $H_2O$ represents the $H_2O$ that would be contained by the raw limonitic feed ore, averaging about 40% $H_2O$.

TABLE 3

Acid pressure leaching of limonite ores; Re-circulation of mother liquor; Nickel and cobalt extractions

| | | | | | | | % Extractions | | | |
|---|---|---|---|---|---|---|---|---|---|---|
| Ore Sample | Leach No | Rxn Time min | Pulping Medium | Solution (gpl) Ni | Co | $H_2SO_4$ | Sol'n Assay Ni | Co | Residue Assay Ni | Co |
| NC-2 | 1st | 00 | $H_2O$ | | | | | | | |
| | | 12 | | 5.01 | 0.91 | | 97.7 | 96.7 | | |
| | | 20 | | 5.05 | 0.94 | | 98.1 | 99.2 | | |
| | | 25 | | 5.06 | 0.93 | | 98.0 | 98.2 | | |
| | | 30 | | 5.11 | 0.94 | 50 | 98.9 | 98.8 | 98.9 | 98.8 |
| NC-1 | 2nd | 00 | ML1 | 4.92 | 0.91 | 43 | | | | |
| | | 10 | | 8.64 | 1.43 | | 88.8 | 82.2 | | |
| | | 20 | | 8.89 | 1.51 | | 93.4 | 91.8 | | |
| | | 25 | | 9.08 | 1.55 | | 93.9 | 91.8 | | |
| | | 30 | | 9.07 | 1.55 | 52 | 96.8 | 95.0 | 96.8 | 95.0 |
| NC-1 | 3rd | 00 | ML2 | 8.41 | 1.44 | 49 | | | | |
| | | 10 | | 10.80 | 1.75 | | 77.0 | 82.8 | | |
| | | 20 | | 11.21 | 1.83 | | 82.7 | 90.6 | | |
| | | 25 | | 11.54 | 1.86 | | 86.9 | 92.7 | | |
| | | 30 | | 12.29 | 1.91 | 58 | 96.2 | 97.0 | 96.2 | 97.0 |

EXAMPLE 2

To further demonstrate the main features of the present invention, as well as to demonstrate additional advantageous variations and improvements, a third sample of limonitic laterite ore, of the composition given in Table 4, was obtained from the East Coast region of New Caledonia for acid pressure leaching; while a highly-serpentinized saprolite ore from the same region was obtained for partial neutralization of leach pulp emanating from the autoclave. Two acid pressure leaching tests were carried out where in the first test dry ore sample was pulped with fresh water while in the second test ore was pulped in its natural state, i.e. containing 40% by weight of $H_2O$, with addition of recycle mother liquor, ML1, from the first leach after the pulp from the first pressure leach was first partially neutralized by atmospheric leaching with highly-serpentinized saprolite ore to a pH of about 1.7. The reacted pulp emanating from the second pressure leach was also firstly partially neutralized by atmospheric leaching of highly-serpentinized saprolite ore to a pH of about 1.7, before being settled and filtered to yield a pregnant solution containing the nickel, cobalt and significant quantities of iron and magnesium leached from the highly-serpentinized saprolite ore. Results are summarized in Tables 5 and 6. The final pregnant solution with 10.3 gpl of Ni, 1.7 gpl of Co and 51.1 gpl of magnesium was then partially neutralized to a pH of 3.0 to precipitate some 87% of its contained iron, by the addition of magnesia. After removal of the iron precipitate by filtration, one portion of the clarified pregnant solution of pH 3.0 was reacted with additional quantities of magnesia to a pH of 7.6 thereby precipitating out most of the nickel, cobalt, manganese and remaining iron. Another portion of the same clarified pregnant solution was reacted with $Na_2S$ to precipitate out virtually all of the nickel, cobalt and remaining iron but only 30% of the manganese, yielding a final solid product analyzing 15.5% Ni, 2.4% Co, 0.4% Mn and 0.5% Fe.

TABLE 4

Laterite ores from the East Coast of New Caledonia

Chemical Composition Wt %

| Ore Sample | Ni | Co | Mn | Fe | MgO | SiO$_2$ | Al$_2$O$_3$ | Cr$_2$O$_3$ | LOI |
|---|---|---|---|---|---|---|---|---|---|
| M4-Limonite | 1.57 | 0.28 | 1.20 | 46.5 | 1.5 | 4.6 | 4.2 | 3.0 | 14.2 |
| M1-Saprolite | 1.92 | 0.02 | 0.11 | 7.3 | 32.0 | 39.2 | 0.6 | 0.5 | 14.3 |

TABLE 5

Acid pressure leaching of limonitic ores; Re-circulation of mother liquor;
Atmospheric neutralization/leaching with highly-serpentinized saprolite ores;
Leaching conditions

| | | Weights of Reactants | | | | | | Leach Conditions | | |
|---|---|---|---|---|---|---|---|---|---|---|
| Ore Sample | Leach No. | Ore g | H$_2$O* g | H$_2$O g | "ML" g | H$_2$SO$_4$ g | H$_2$SO$_4$ % of Ore | Pulp % Solids | Temp °C. | Press psia | Time min |
| M4 | 1$^{st}$ | 360 | 240 | 495 | 0 | 105 | 29 | 30 | 270 | 800 | 30 |
| M1 | | 27 | | | Partial neutralization to pH 1.7 | | | | 98 | Atm. | 40 |
| M4 | 2$^{nd}$ | 360 | 240 | 76 | 425 | 99 | 28 | 30 | 270 | 800 | 30 |
| M1 | | 36 | | | Partial neutralization to pH 1.7 | | | | 97 | Atm. | 40 |

*This H$_2$O represents the H$_2$O that would be contained by the raw limonitic feed ore, averaging about 40% H$_2$O.

TABLE 6

Acid pressure leaching of limonite ores; Re-circulation of mother liquor;
Atmospheric neutralization/leaching with highly-serpentinized saprolite ore;
Nickel, cobalt and magnesium extractions

| Ore Sample | Leach No | Rxn Time min | Pulping Medium | Solution (gpl) | | | | % Extractions | | |
|---|---|---|---|---|---|---|---|---|---|---|
| | | | | Ni | Co | Mg | H$_2$SO$_4$ | Ni | Co | Mg |
| M4 | 1$^{st}$ | 00 | H$_2$O | | | | | | | |
| | | 10 | | 6.6 | 1.2 | 5.5 | 48 | 87.7 | 87.7 | 100 |
| | | 20 | | 6.8 | 1.3 | 5.6 | 49 | 90.7 | 96.1 | 100 |
| | | 30 | | 7.1 | 1.3 | 6.0 | 50 | 93.0 | 99.0 | 100 |
| M1 | | 40 | | 7.4 | 1.3 | 14.5 | 8 | | | |
| M4 + M1 | | Overall extraction based on residue analyses | | | | | | 96.8 | 96.8 | 77.8 |
| M4 | 2$^{nd}$ | 00 | ML1 | 7.4 | 1.3 | 14.5 | 8 | | | |
| | | 10 | | 9.3 | 1.4 | 24.3 | 57 | 83.3 | 65.7 | 71.7 |
| | | 20 | | 10.4 | 1.7 | 27.9 | 58 | 95.7 | 91.2 | 100 |
| | | 30 | | 8.7 | 1.5 | 23.3 | 50 | 75.0 | 76.0 | 62.2 |
| M1 | | 40 | | 10.3 | 1.7 | 51.1 | 21 | | | |
| M4 + M1 | | Overall extraction based on residue analyses | | | | | | 86.0 | 85.7 | 67.3 |

As can be seen from the 2$^{nd}$ Leach, Tables 5 and 6, there is evidence from the solution samples taken during the course of the pressure leaching, that nickel, cobalt and magnesium were precipitating and re-dissolving in the sampling apparatus yielding the anomalous pattern of extractions. More significantly, extractions based on final leached residue analyses indicate, strongly, that a reaction time of 30 minutes is inadequate in a system that has been supercharged with nickel, cobalt and magnesium, by re-circulation of mother liquor.

EXAMPLE 3

Additional tests were carried out with limonite ore M4, circulating mother liquor ML as in Example 1, i.e., without any prior partial neutralization as had been done in Example 2, and following the flowsheet of FIG. 3. Furthermore, the reaction time with re-circulated ML, the 2$^{nd}$ Leach, was lengthened to 60 minutes. As seen from Tables 7 and 8, high nickel and cobalt extractions were achieved, and a final leach solution containing 12.1 gpl Ni, 2.1 gpl Co, and also containing 4.4 gpl Fe was produced. The leach pulp emanating from the autoclave after the 2$^{nd}$ leach, was partially neutralized with highly-serpentinized saprolite ore, M1, at a temperature of 96° C., to a pH of 1.65, in 30 minutes. This partially neutralized leach pulp was further neutralized to a pH of 3.2, at an average temperature of 91° C., by the addition of fine CaCO$_3$. The leach pulp was then settled, filtered and washed to yield a clarified pregnant solution analyzing 12.9 gpl Ni, 2.1 gpl Co and only 0.05 gpl Fe, ready to pass on to nickel and cobalt recovery.

TABLE 7

Acid pressure leaching of limonite ores; Re-circulation of mother liquor;
Leaching conditions

| Ore Sample | Leach No. | Weights of Reactants | | | | | | | Leach Conditions | | |
|---|---|---|---|---|---|---|---|---|---|---|---|
| | | Ore g | $H_2O$* g | $H_2O$ g | "ML" g | $H_2SO_4$ g | $H_2SO_4$ % of Ore | Pulp % Solids | Temp °C. | Press psia | Time min |
| M4 | 1st | 360 | 240 | 488 | 0 | 112 | 31 | 30 | 270 | 800 | 30 |
| M4 | 2nd | 360 | 240 | 142 | 360 | 97.6 | 27 | 30 | 270 | 800 | 60 |

*This $H_2O$ represents the $H_2O$ that would be contained by the raw limonitic feed ore, averaging about 40% $H_2O$.

TABLE 8

Acid pressure leaching of limonite ores; Re-circulation of mother liquor;
Nickel, cobalt and magnesium extractions

| Ore Sample | Leach No | Rxn Time min | Pulping Medium | Solution (gpl) | | | | % Extractions | | |
|---|---|---|---|---|---|---|---|---|---|---|
| | | | | Ni | Co | Mg | $H_2SO_4$ | Ni | Co | Mg |
| M4 | 1st | 30 | $H_2O$ | 8.6 | 1.5 | 7.1 | 44 | 93 | 96 | 100 |
| | | | Based on residue analyses | | | | | 95.0 | 89 | 48 |
| M4 | 2nd | 00 | ML1 | 8.6 | 1.5 | 7.1 | 44 | | | |
| | | 30 | | 9.6 | 1.7 | 8.2 | 43 | 73 | 76 | 110 |
| | | 45 | | 8.2 | 1.4 | 6.8 | 40 | 56 | 46 | 80 |
| | | 60 | | 14.3 | 2.3 | 12.3 | 73 | 132 | 130 | 200 |
| | | Final | | 12.1 | 2.1 | 10.6 | 72 | 104 | 105 | 160 |
| | | Based on residue analyses | | | | | | 96.5 | 85+ | 35+ |

As can be seen from the $2^{nd}$ leach, Tables 7 and 8, there is the same evidence from solution samples taken during the course of the pressure leaching, as was already seen in the $2^{nd}$ leach of Example 2, that nickel, cobalt and magnesium were precipitating and re-dissolving in the sampling apparatus, yielding the anomalous pattern of extractions. Also seen from Table 8, based on final leached residue analyses, is that a reaction time of 60 minutes was more than adequate to yield a good extraction level of nickel. The anomalous magnesium results suggest that a significant proportion of the magnesium was precipitating out and reporting in the leached residue.

The process of the present invention is very advantageous over current processes for several reasons. For example, either all or a very large proportion of the fresh water requirement in the pulping step can be replaced by re-circulation of mother liquor emanating from the pressure vessels. Since this mother liquor contains unreacted acid, up to 40% of that initially added to the prepared feedstock ore, overall acid consumption can be significantly reduced. Also, the amount of basic reagents required for subsequent neutralization are reduced by a corresponding amount and the quantity of process liquid effluent discharged is significantly reduced.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

I claim:

1. A process of leaching a nickel and cobalt containing predominantly limonitic portion of a laterite ore profile, comprising the steps of:
   a) preparing a feedstock of a predominantly limonitic portion of a laterite ore containing nickel and cobalt;
   b) pulping said feedstock with a liquid to produce a pulped ore;
   c) adding an effective amount of sulphuric acid to the pulped ore to produce a sulphuric acid solution, agitating and leaching said feedstock in said sulphuric acid solution at an elevated temperature under pressure for a selected period of time whereby metal oxides are leached from said ore to produce a leach pulp;
   d) separating said leach pulp into a mother liquor solution and a first thickened leach pulp, wherein said liquid used to pulp said feedstock in step b) includes a selected amount of said mother liquor solution; and
   e) recovering nickel and cobalt products from said first thickened leach pulp.

2. The process according to claim 1 wherein said liquid includes water and said selected amount of said mother liquor solution.

3. The process according to claim 2 wherein said amount of mother liquor solution present in said liquid is selected to ensure a concentration of dissolved nickel does not exceed about 15 grams/liter in said liquid and a concentration of dissolved magnesium does not exceed about 12 grams/liter in said liquid.

4. The process according to claim 3 wherein said effective amount of sulphuric acid added to said pulped ore includes sulphuric acid added directly to said pulped ore and unreacted sulphuric acid present in said mother liquor solution.

5. The process according to claim 4 wherein said step of recovering nickel and cobalt products from said first thickened leach pulp includes
   a) separating said first thickened leach pulp into a first pregnant solution containing sulphates of said metals and a second thickened leach pulp which includes a leached ore tailings fraction and barren solution,
   b) partially neutralizing said first pregnant solution by mixing it with limestone to form a mixture and agitating said mixture for an effective period of time to precipitate dissolved iron and gypsum;

c) separating said partially neutralized first pregnant solution into a first clarified pregnant solution and a tailings pulp fraction containing principally iron hydroxide, gypsum and neutralized pregnant solution;

d) separating said tailings pulp fraction into a second clarified pregnant solution and solids including said iron hydroxide and gypsum; and e) recovering cobalt and nickel from said first and second clarified pregnant solutions.

6. The process according to claim 4 wherein said step of recovering nickel and cobalt products from said first thickened leach pulp includes a) separating said first thickened leach pulp using a counter-current decantation system into a first pregnant solution containing sulphates of said metals and a second thickened pulp which includes a leached ore tailings fraction and barren solution;

b) partially neutralizing said first pregnant solution by mixing it with limestone to form a mixture and agitating said mixture for an effective period of time to precipitate dissolved iron and gypsum;

c) separating said partially neutralized first pregnant solution into a first clarified pregnant solution and a thickened tailings pulp fraction containing principally iron hydroxide, gypsum and neutralized pregnant solution;

d) recirculating said thickened tailings pulp fraction to said counter-current decantation system wherein said neutralized pregnant solution is mixed with said first pregnant solution in step a) and said iron hydroxide and gypsum are mixed with said leached ore tailings and barren solution; and f) recovering cobalt and nickel from said first pregnant solution.

7. The process according to claim 5 wherein said step of recovering cobalt and nickel from said first and second clarified pregnant solutions includes reacting said first and second clarified pregnant solutions with a basic oxide selected from the group consisting of lime and magnesia to produce an intermediate hydroxide nickel and cobalt product.

8. The process according to claim 5 wherein said step of recovering cobalt and nickel from said first and second clarified pregnant solutions includes reacting said first and second clarified pregnant solutions with a suitable sodium compound to produce an intermediate hydroxide or carbonate nickel and cobalt product.

9. The process according to claim 8 wherein said sodium compound is soda ash.

10. The process according to claim 5 wherein said step of recovering cobalt and nickel from said first and second clarified pregnant solutions includes reacting said first and second clarified pregnant solutions with a sulphiding agent to produce an intermediate nickel and cobalt sulphide product.

11. The process according to claim 10 wherein said sulphiding agent is hydrogen sulphide or a sodium sulphide compound.

12. The process according to claim 5 wherein said feedstock is pulped with said liquid to give said pulped ore with a density of between about 30% and 40% solids.

13. The process according to claim 4 wherein said step of recovering nickel and cobalt products from said first thickened leach pulp includes a) partially neutralizing said first thickened leach pulp by mixing said first thickened leach pulp at a temperature above about 90° C. with an effective amount of highly-serpentinized high-magnesia saprolite ore feedstock for an effective period of time at atmospheric pressure to neutralize excess acid contained in said first thickened leach pulp and to dissolve cobalt and nickel contained in said highly-serpentinized high-magnesia saprolite ore feedstock thereby producing a second leach pulp, and b) partially neutralizing said second leach pulp by mixing said second leach pulp with a basic oxide and agitating said mixture for an effective period of time to precipitate dissolved iron;

c) separating the partially neutralized second leach pulp into a clarified pregnant solution and a tailings fraction including predominantly leached limonitic and saprolitic ore tailings, iron hydroxide and gypsum, and d) recovering cobalt and nickel from said clarified pregnant solution.

14. The process according to claim 13 wherein said basic oxide is selected from the group consisting of limestone, magnesia and magnesite.

15. The process according to claim 14 wherein said effective amount of highly-serpentinized high-magnesia saprolite ore is sufficient to give the reacted mixture of thickened leach pulp and highly-serpentinized high-magnesia saprolite ore feedstock a pH between 1.5 and 2.0, and wherein the basic oxide is added in an amount to give the reacted mixture of the basic oxide and said second leach pulp a pH of between 3.5 and 4.5.

16. The process according to claim 15 wherein said step of recovering cobalt and nickel from said clarified pregnant solution includes reacting said clarified pregnant solution with a basic oxide selected from the group consisting of lime and magnesia to produce an intermediate hydroxide nickel and cobalt product.

17. The process according to claim 15 wherein said step of recovering cobalt and nickel from said clarified pregnant solution includes reacting said clarified pregnant solution with soda ash to produce an intermediate hydroxide/carbonate nickel and cobalt product.

18. The process according to claim 15 wherein said basic oxide is selected from the group consisting of magnesite and magnesia, and wherein said step of recovering cobalt and nickel from said clarified pregnant solution includes reacting said clarified pregnant solution with soda ash to produce an intermediate hydroxide/carbonate nickel and cobalt product.

19. The process according to claim 15 wherein said step of recovering cobalt and nickel from said clarified pregnant solution includes reacting said clarified pregnant solution with a sulphiding agent to produce an intermediate nickel and cobalt sulphide product.

20. The process according to claim 15 wherein said basic oxide is selected from the group consisting of magnesite and magnesia, and wherein said step of recovering cobalt and nickel from said clarified pregnant solution includes reacting said clarified pregnant solution with a sulphiding agent to produce an intermediate nickel and cobalt sulphide product.

21. The process according to claim 19 wherein said sulphiding agent is hydrogen sulphide or a sodium sulphide compound.

22. The process according to claim 13 wherein said feedstock is pulped with said liquid to give said pulped ore with a density of between about 30% and 40% solids.

23. The process according to claim 1 wherein said elevated temperature is at least about 250° C.

24. The process according to claim 13 wherein said elevated temperature is at least about 250° C.

25. The process according to claim 5 wherein the step of partially neutralizing said first pregnant solution by mixing it with limestone and agitating said mixture for an effective period of time further precipitates an element selected from a group of elements consisting of chromium and aluminum.

26. The process according to claim 6 wherein the step of partially neutralizing said first pregnant solution by mixing it with limestone and agitating said mixture for an effective period of time further precipitates an element selected from a group of elements consisting of chromium and aluminum.

27. The process according to claim 13 wherein the step of partially neutralizing said first pregnant solution by mixing it with limestone and agitating said mixture for an effective period of time further precipitates an element selected from a group of elements consisting of chromium and aluminum.

* * * * *